(12) United States Patent
Vuylsteke et al.

(10) Patent No.: US 10,907,947 B2
(45) Date of Patent: Feb. 2, 2021

(54) RULE STOP BLOCK

(71) Applicant: VSM LLC, Wadsworth, OH (US)

(72) Inventors: David Vuylsteke, Wadsworth, OH (US); David H. Vuylsteke, Jr., Eau Claire, WI (US); James W. Miller, Jr., Wadsworth, OH (US)

(73) Assignee: VSM LLC, Wadsworth, OH (US)

( * ) Notice: Subject to any disclaimer, the term of this patent is extended or adjusted under 35 U.S.C. 154(b) by 157 days.

(21) Appl. No.: 16/398,494

(22) Filed: Apr. 30, 2019

(65) Prior Publication Data

US 2019/0339052 A1    Nov. 7, 2019

Related U.S. Application Data (60) Provisional application No. 62/665,264, filed on May 1, 2018.

(51) Int. Cl.
*G01B 3/32* (2006.01)
*G01B 3/04* (2006.01)

(52) U.S. Cl.
CPC ............... *G01B 3/32* (2013.01); *G01B 3/04* (2013.01)

(58) Field of Classification Search
CPC ........................................................ G01B 3/32
USPC ........................................... 33/484–491, 770
See application file for complete search history.

(56) References Cited

U.S. PATENT DOCUMENTS

| | | | |
|---|---|---|---|
| 1,109,444 A | 9/1914 | McLaughlin | |
| 3,289,305 A * | 12/1966 | Norton | G01B 3/1084 33/759 |
| 3,744,134 A * | 7/1973 | Zima, Jr. | G01B 3/1071 33/768 |
| 3,813,785 A * | 6/1974 | Larsen | G01B 3/006 33/487 |
| 3,955,073 A * | 5/1976 | Carew | G01B 5/0021 702/161 |
| 5,179,787 A * | 1/1993 | Ostrowski | A47H 1/10 33/528 |
| 5,309,642 A * | 5/1994 | McGinnis | B26B 29/06 33/32.2 |
| 5,915,806 A * | 6/1999 | Levee | B25F 1/00 33/42 |
| 7,490,415 B1 * | 2/2009 | Cubbedge | G01B 3/1071 33/770 |
| 2002/0056200 A1 * | 5/2002 | Nikolov | G01B 3/20 33/27.032 |
| 2004/0060188 A1 * | 4/2004 | Cubbedge | G01B 3/1071 33/770 |
| 2007/0144019 A1 * | 6/2007 | Delfini | B25H 7/00 33/286 |

(Continued)

OTHER PUBLICATIONS

Ruler Stop/Ruler Attachment produced by Shinwa of Japan and as sold at the IP address of https://www.alibaba.com/product-detail/Ruler-Stop-Ruler-Attachment-Brass-for_144593825.html.

*Primary Examiner* — George B Bennett
(74) *Attorney, Agent, or Firm* — Renner, Kenner, Greive, Bobak, Taylor & Weber (57) ABSTRACT

The present invention relates to a rule stop block. The rule stop block includes a block body and an adjustable slider. Exterior opposed end walls, opposed sidewalls, a top planar face and a bottom planar face define the block body. The adjustable slider is adjustably positioned within an interior of the block body and is adapted to engage a rule.

19 Claims, 5 Drawing Sheets

(56) References Cited

U.S. PATENT DOCUMENTS

| | | | |
|---|---|---|---|
| 2010/0000102 A1* | 1/2010 | Contreras | B43L 9/245 33/27.03 |
| 2015/0047214 A1* | 2/2015 | Chernyshou | B43L 7/02 33/479 |
| 2015/0268024 A1* | 9/2015 | Brossard | G01B 3/1056 33/760 |

* cited by examiner

RULE STOP BLOCK

CROSS-REFERENCE TO RELATED APPLICATIONS

This application claims priority to U.S. Provisional Patent Application No. 62/665,264 entitled "Rule Stop Block", filed on May 1, 2018, the contents of which are incorporated herein by reference.

FIELD OF THE INVENTION

This invention relates to a device that can convert standard measuring rules of various widths, thicknesses, and lengths into a versatile measuring instrument. More particularly, this invention relates to a rule stop block designed to transfer dimensions from project to workpiece without the need to use rule scales. Most particularly, the rule stop block provides a means to obtain and record precise measurements from locations where reading the scale on a measuring device is difficult or impossible. The rule stop block has the means to be adjustable to fit variously sized pieces, workpieces and/or measuring rules. Finally, the use of two or more rule stop blocks of the present invention will provide the user with the ability to transfer and repeat multiple dimensions at once, as well as being able to be used along with a measuring rule to provide multiple locations for fasteners such as those used to hang items on a wall.

BACKGROUND OF THE INVENTION

Straight rulers, measuring tapes, yard sticks and carpenter rulers are examples of several well-known measuring devices. Each of these measuring devices is provided with numbers printed thereon that correspond to units of measure. The set of numbers is usually printed on the measuring device such that the numbers are arranged in upright position one after the other and increase in value starting from the first end of the measuring device.

Many measuring devices are also provided with a second set of numbers printed thereon. The second set of numbers usually provides a measurement scale different than the first set of numbers. On such devices, the two sets of numbers are printed in upside-down orientation relative to each other along opposed lengthwise edges of the device. Each set of numbers ascends in value starting at opposed ends of the measuring device, respectively.

Prior art measuring devices are designed to measure the distance between a first point (e.g., the point being measured from) and a second point (e.g., the point being measured to) by positioning the first end of the measuring device at the first point, extending the measuring device to the second point, and determining from the measurement indicia on the measuring device the distance between the first point and the second point. In order to read the measurement right side up, the first end of the measuring device must be positioned to the left of the point being measured to. If the first end of the measuring device is positioned to the right of the point being measured to, prior art measuring devices must be turned upside-down. As a result, the user must read the measurement upside-down as well. This can be troublesome to the user and cause inaccurate measurements.

Other prior art measuring devices, such as measuring tapes, have another significant problem. Most measuring tapes are provided with an "L-shaped" metal hook attached to the free end of the blade. This "L-shaped" metal hook is designed to removably attach the free end of the measuring tape to a position on the object being measured. Since the "L-shaped" tab extends in only one direction, transverse to the surface of the measuring tape, the measuring tape is often oriented in an awkward or unreadable position. For example, to measure the underside of an object, the measuring tape must be turned over in order for the tab to hook the underside edge of the object. In this position, only the blank, reverse side of the tape is exposed. Furthermore, long distances cannot be easily measured by a single person on objects with irregular edges. The "L-shaped" hook of measuring tapes, for example, cannot grasp a rounded edge. Previously, a distance greater than the reach of the individual doing the measuring would be impractical to measure without assistance Using prior art measuring devices also becomes troublesome to the user if the user is trying to, for example, measure the distance between two points that are high above the user's head. If using a standard prior art measuring tape, it is difficult to get the flimsy tape measurer in the proper position at highest of the two points. Even if the user manages to properly position the tape measurer, it is difficult for the user to read the distance between the higher of the two points and the second point. If a user instead opted to use a more rigid measuring device, such as a yard stick, they still have the problem of difficulty in reading the exact distance between the two points without going to the trouble of getting out and setting up a ladder. Using prior art measuring devices also becomes troublesome when having to make repeat measurements on multiple workpieces.

It would therefore be highly desirable to have a device that provides a means of properly recording and transferring dimensions from project to workpiece that is reliable and easy to use. Such a device will allow a user to use any measuring rule, regardless of size or lack thereof of a set of numbers providing a measurement scale, and be able to obtain precise and repeatable measurements.

SUMMARY OF THE INVENTION

Therefore, it is an object of the present invention to provide a rule stop block that can convert standard measuring rules of various widths, thicknesses, and lengths into a versatile measuring instrument.

It is another object of the present invention to provide a rule stop block that can transfer dimensions from a project to a workpiece without the need to use rule scales.

It is yet another object of the present invention to provide a rule stop block that offers a means to obtain and record precise measurements from locations where reading the scale on a measuring device is difficult or impossible.

These and other objects of the present invention, as well as the advantages thereof over existing prior art forms, which will become apparent from the description to follow, are accomplished by the improvement hereinafter described and claimed.

In general, a rule stop block made in accordance with the present invention includes a block body defined by exterior opposed end walls, opposed sidewalls, a top planar face and a bottom planar face; and an adjustable slider, wherein the adjustable slider is adjustably positioned within an interior of the block body and is adapted to engage a rule.

In general, the present invention also provide a method of utilizing a rule stop block to record a measurement comprises the steps of: positioning a rule in a block body of the rule stop block; placing the rule stop block against a surface;

moving the rule to establish a measurement; and securing the rule within the stop block at the established measurement.

PREFERRED EMBODIMENTS FOR CARRYING OUT THE INVENTION

The number 10 generally indicates an embodiment of a rule stop block made in accordance with the present invention. The shape and size of the rule stop block 10 is discretionary and can take on the shape and size, for example, of a small rectangular box, such as shown in the drawings.

Rule stop block 10 includes a body 12 defined by a first exterior opposed end wall 14, a second exterior opposed end wall 16, opposed sidewalls 18, a top planar face 20, and a bottom planar face 22. Top planar face 20 includes a window 24 providing access to the interior 26 of body 12 of rule stop block 10. Sidewalls 18 additionally contain windows 28 that also provide access to interior 26 of body 12 of rule stop block 10. Windows 28 are defined by an interior top surface 29, an interior bottom surface 30, a window end wall 32, and a window end wall 34 wherein window end wall 34 is a contiguous end wall and wherein window end wall 32 is a non-contiguous end wall.

Figure 3:
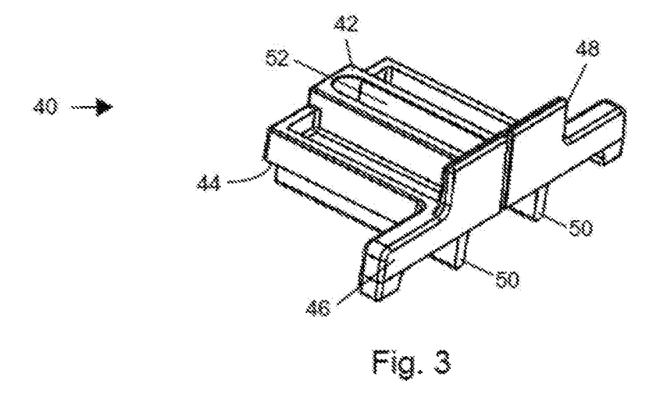
FIG. 3 is a perspective view of an adjustable slider used in combination with the rule stop block of the present invention.
Figure 8:
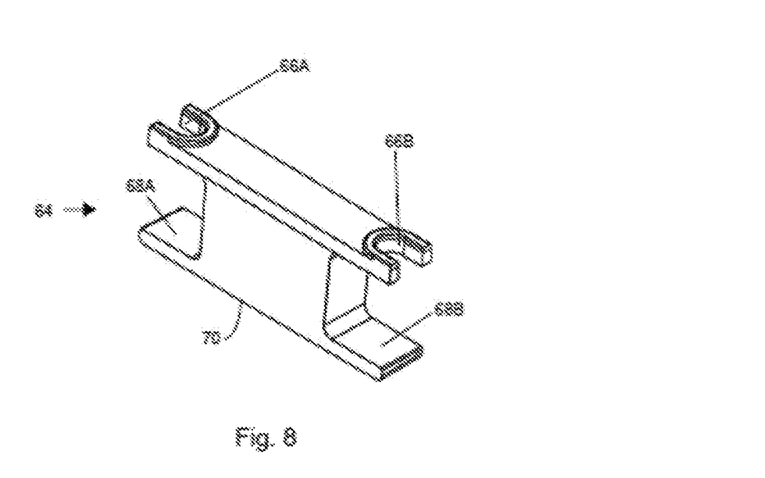
FIG. 8 is a perspective view of a load distribution member used in combination with the rule stop block of the present invention.

Rule stop block 10 also contains inner threaded hole 36, outer threaded hole 38 (FIG. 4), an adjustable slider 40 (FIG. 3), and optionally a load distribution member 64 (FIG. 8). The adjustable slider 40 allows rule stop block 10 to be used with measuring rules of various widths and thicknesses. A standard Phillips screw 39 or other retaining means can be used to combine adjustable slider 40 with rule stop block 10. As shown in FIG. 3, adjustable slider 40 has an upper surface 42, a bottom surface 44, an elongated wall 46 having a raised upper section 48, and a pair of gliders 50 on the bottom surface 44. An aperture 52 extends from the upper surface 42 through to the bottom surface 44. Aperture 52 is shown in FIG. 3 as being in the shape of an elongated oval, the benefit of which will be discussed in detail below.

Figure 4:
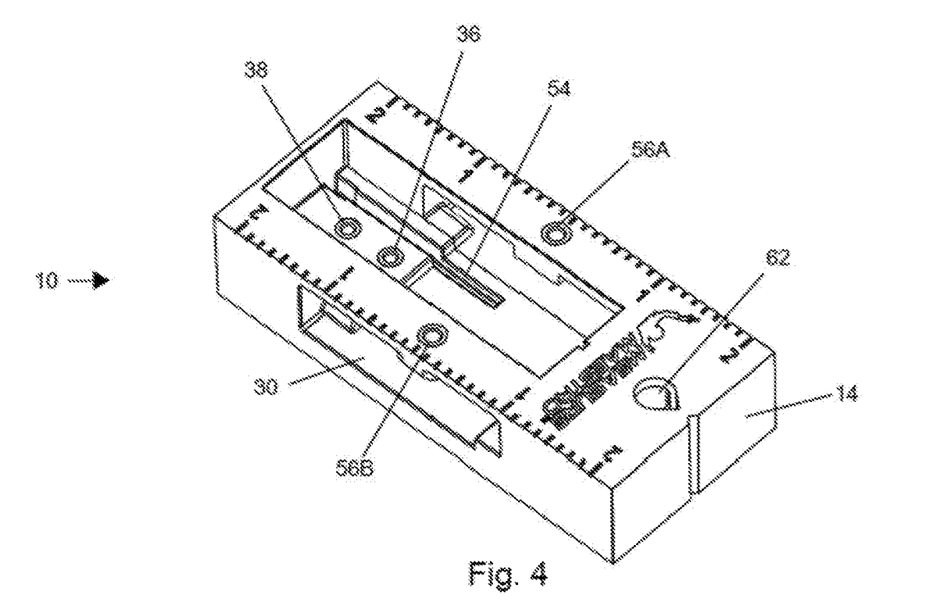
FIG. 4 is a perspective view of the rule stop block of FIG. 1 without the adjustable slider and load distribution member in place.
Figure 5:
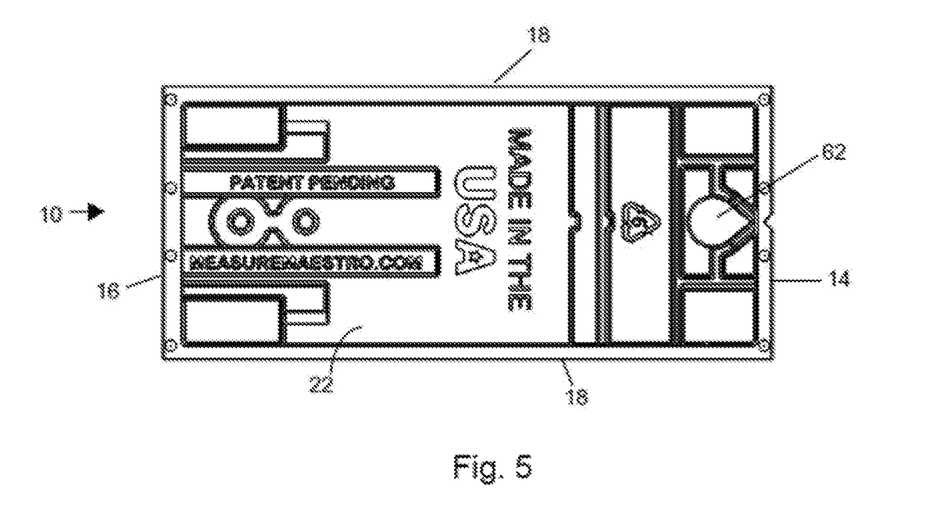
FIG. 5 is a bottom plan view of the rule stop block of FIG. 1.

FIG. 4 shows the rule stop block 10 without the adjustable slider 40 in place. Also shown in FIG. 4 is one of two guide rails 54 located on the interior bottom surface 30 of rule stop block 10. Guide rails 54 interact with gliders 50 of the adjustable slider 40 to allow the adjustable slider 40 to easily move to adjust for fitting measuring rules of various widths and thicknesses.

FIG. 4 also shows aperture 62 near the exterior wall 14. Aperture 62 extends from the top planar face 20 through to the bottom planar face 22 and is a useful feature for a user utilizing the rule stop block 10 to measure, level and mark multiple locations without assistance. To use the aperture 62 as described, a user would simply have to extend a fastening device or a writing utensil through aperture 62 to mark a spot on a workpiece where the fastening device should be placed. Such a mark will be easily repeatable as explained in more detail below.

A pair of opposed threaded holes 56A and 56B extend from the top planar face 20 through to the interior top surface 29. The pair of opposed threaded holes 56A and 56B each are designed to interact with adjustable thumbscrews 58A and 58B. Adjustable thumbscrews 58A and 58B are used to position the rule stop block 10 on a measuring rule as will be discussed in more detail below.

Figure 1:
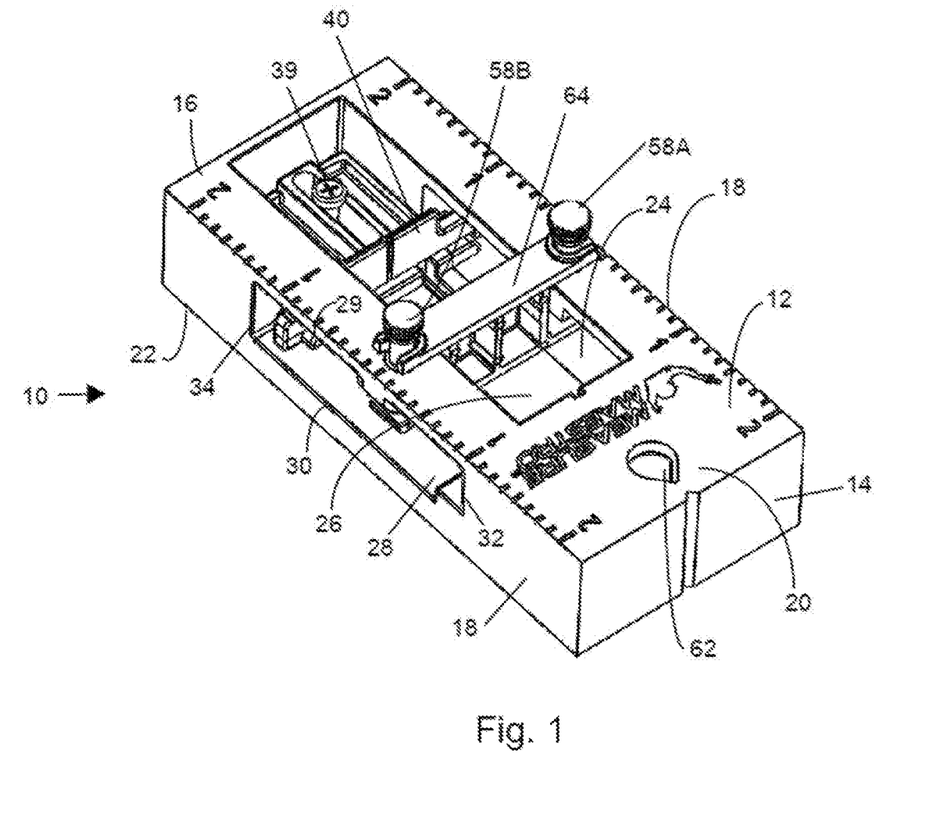
FIG. 1 is a perspective view of the rule stop block of the present invention.
Figure 2:
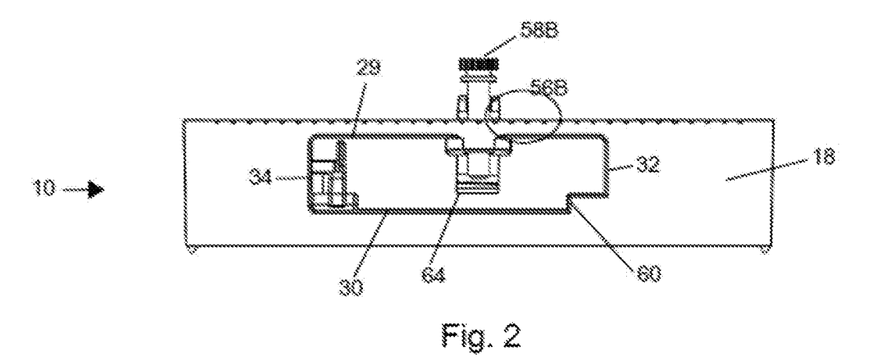
FIG. 2 is a side elevational view of the rule stop block of FIG. 1.
Figure 6:
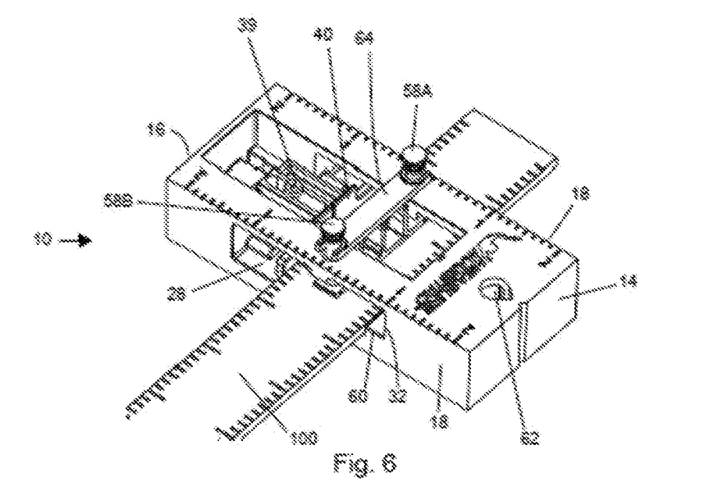
FIG. 6 is a top perspective view of the rule stop block of the present invention showing a measuring rule in place within the rule stop block.

A process for using rule stop block 10 with a measuring rule having a width, for example, of between 1 and 1.5 inches will now be discussed. As shown in FIG. 6, adjustable slider 40 is installed within the interior 26 of rule stop block 10 by aligning the gliders 50 of the adjustable slider 40 with the guide rails 54 and then inserting retaining means 39 through aperture 52 of the adjustable slider 40 and into inner threaded hole 36 while making sure not to fully tighten the retaining means 39 at this time. Next, the pair of adjustable thumbscrews 58A and 58B must be retracted such that interior 26 of rule stop block 10 is clear of their screw ends. Then, as shown in FIG. 6, a measuring rule 100, having a width of between 1 and 1.5 inches, is slid into the interior 26 through one of the windows 28 in one of the sidewalls 18. Measuring rule 100 is then slid firmly against a narrow stop edge 60, best shown in FIG. 2. Such properly positions an edge of rule 100.

Next, if a user wanted to use the optional load distribution member 64 (as is shown in FIG. 6), the load distribution member 64 (as shown in FIG. 8) would be placed into position. To position the load distribution member 64, the load distribution member 64 will be placed such that the top of the adjustable screw thumbs 58A and 58B are placed within the upper screw openings 66A and 66B of the load distribution member 64. Then, the lower arm 70 would lie over a top surface of the measuring rule 100. Then, with measuring rule 100 already in place firmly against the narrow stop edge 60, the adjustable screws 58A and 58B should be tightened such that the screw ends of the adjustable thumbscrews 58A and 58B would abut against the upper portions 68A and 68B of lower arm 70 of the load distribution member 64. When utilized in this manner, load distribution member 64 is able to distribute the load from the adjustable thumbscrews 58A and 58B to the top surface of the measuring rule 100 over an increased surface area.

If a user was not utilizing the optional load distribution member 64, once measuring rule 100 is placed firmly against the narrow stop edge 60, the adjustable thumbscrews 58A and 58B should be lightly tightened against measuring rule 100 to establish a frictional fit against the measuring rule 100. Once the adjustable thumbscrews 58A and 58B are in place as described above (with or without the use of the optional load distribution member 64), the gliders 50 of adjustable slider 40 are moved along the guide rails 54 in the interior bottom surface 30 of rule stop block 10 so as to place the adjustable slider 40 firmly against an edge of the measuring rule 100. Once the adjustable slider 40 is firmly in place against measuring rule 100, retaining means 39 is tightened within inner threaded hole 36.

The use of the adjustable thumbscrews 58A and 58B alone, or in combination with the load distribution member 64, gives rule stop block 10 the versatility to be used with rules having a wide variety of thicknesses. This is accomplished by the ability to adjust the length of the adjustable thumbscrews 58A and 58B to varying depths within the body of the rule stop block 10.

To use the rule stop block 10 and measuring rule 100 to record a measurement, the user would first loosen one of the adjustable thumbscrews, for example 58A, while keeping the other adjustable thumbscrew, 58B in this example, in a frictional fit against the measuring rule 100 or, if the optional load distribution member 64 is being utilized, in a frictional fit against the upper portion 68B of lower arm 70. Then, a user would place rule stop block 10 against the end of a workpiece and the rule stop block 10 can be moved along measuring rule 100 until the proper measurement is determined. Rule stop block 10 can be moved along the measuring rule 100 because of the frictional fit of adjustable thumbscrew 58B. Once the proper measurement is determined, the measuring rule 100 and rule stop block 10 can be removed from the workpiece. Once removed, adjustable thumbscrew 58A should then be firmly tightened against the measuring rule 100 or, if the optional load distribution member 64 is being utilized, in a frictional fit against the upper portion 68A of lower arm 70, so as to lock in the measurement. Then, the measuring rule 100 and rule stop block 10 can be taken to a new workpiece, and the exact measurement as originally taken on the first workpiece is locked in and can easily be repeated on the new workpiece. In addition, once the rule stop block 10 has been firmly locked into place with the measuring rule 100, the aperture 62 can be used to mark a spot for a nail/screw on a workpiece.

Figure 7:
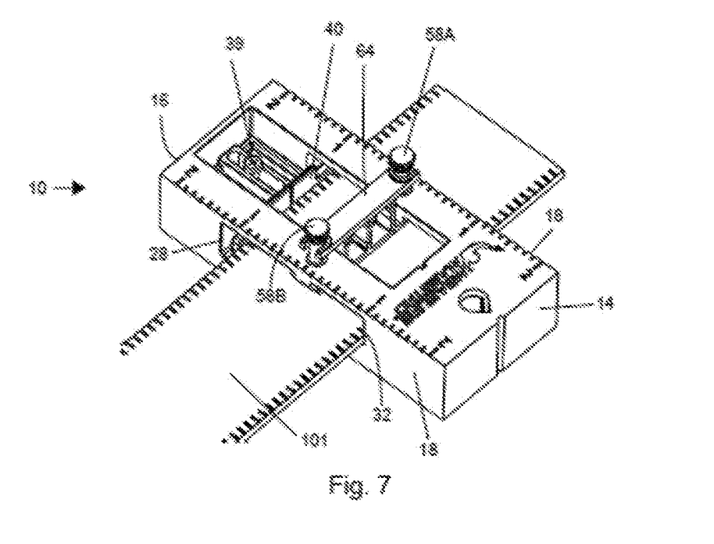
FIG. 7 is a top perspective view of the rule stop block of the present invention showing a measuring rule which is wider than the measuring rule shown in FIG. 6 in place within the rule stop block.

A process for using rule stop block 10 with a measuring rule having a larger width, for example, between 1.6 and 2 inches will now be discussed. As shown in FIG. 7, adjustable slider 40 is installed within the interior 26 of rule stop block 10 by aligning the gliders 50 of the adjustable slider 40 with the guide rails 54 and then inserting retaining means 39 through aperture 52 of the adjustable slider 40 and into outer threaded hole 38 while making sure not to fully tighten the retaining means 39 at this time. Next, the pair of adjustable thumbscrews 58A and 58B must be retracted such that the interior 26 is clear of their screw ends. Then, as shown in FIG. 7, a measuring rule 101, having a width between 1.6 and 2 inches, is slid into the interior 26 through one of the windows 28 in one of the sidewalls 18. Measuring rule 101 is then slid firmly against the window end wall 32. Such properly positions an edge of rule 101.

Next, if a user wanted to use the optional load distribution member 64 (as is shown in FIG. 7), the load distribution member 64 (as shown in FIG. 8) would be placed into position. To position the load distribution member 64, the load distribution member 64 will be placed such that the top of the adjustable screw thumbs 58A and 58B are placed within the upper screw openings 66A and 66B of the load distribution member 64. Then, the lower arm 70 would lie over a top surface of the measuring rule 101. Then, with measuring rule 101 already in place firmly against the window end wall 32, the adjustable thumbscrews 58A and 58B should be tightened such that the screw ends of the adjustable thumbscrews 58A and 58B would abut against the upper portions 68A and 68B of lower arm 70 of the load distribution member 64. When utilized in this manner, load distribution member is able to distribute the load from the adjustable thumbscrews 58A and 58B to the top surface of the measuring rule 101 over an increased surface area.

If a user was not utilizing the optional load distribution member 64, measuring rule 101 is placed firmly against the window end wall 32, the adjustable thumbscrews 58A and 58B should be lightly tightened against measuring rule 101 to establish a frictional fit against the measuring rule 101. Once the adjustable thumbscrews 58A and 58B are in place as described above (with or without the use of the optional load distribution member 64), the gliders 50 of adjustable slider 40 are moved along the guide rails 54 in the interior bottom surface 30 of rule stop block 10 so as to place the adjustable slider 40 firmly against an edge of measuring rule 101. Once the adjustable slider 40 is firmly in place against measuring rule 101, retaining means 39 should be tightened within outer threaded hole 38.

To use the rule stop block 10 and measuring rule 101 to record a measurement, the user first loosens one of the adjustable screws, for example 58A, while keeping the other adjustable thumbscrew, 58B in this example, in a frictional fit against the measuring rule 101 or, if the optional load distribution member 64 is being utilized, in a frictional fit against the upper portion 68B of lower arm 70. Then, a user places rule stop block 10 against the end of a workpiece and the rule stop block 10 can be moved along measuring rule 101 until the proper measurement is determined. Rule stop block 10 can be moved along the measuring rule 101 because of the frictional fit of adjustable thumbscrew 58B. Once the proper measurement is determined, the measuring rule 101 and rule stop block 10 can be removed from the workpiece. Once removed, adjustable thumbscrew 58A should then be firmly tightened against the measuring rule 101 or, if the optional load distribution member 64 is being utilized, in a frictional fit against the upper portion 68A of lower arm 70, so as to lock in the measurement. Then, the measuring rule 101 and rule stop block 10 can be taken to a new workpiece, and the exact measurement as originally taken on the first workpiece is locked in and can easily be repeated on the new workpiece. In addition, once the rule stop block 10 has been firmly locked into place with the measuring rule 101, the aperture 62 can be used to mark a spot for a nail/screw on a workpiece.

Figure 9:
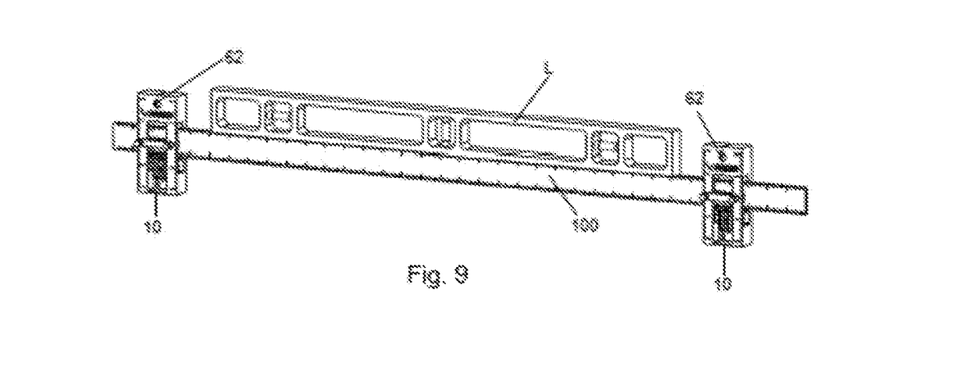
FIG. 9 is a perspective view showing the use of two rule stop blocks of the present invention with a measuring rule is in place within each of the rule stop blocks.

As shown in FIG. 9, multiple rule stop blocks 10 can be fixedly secured to a measuring rule 100. Such a configuration of multiple rule stop blocks 10, and in combination with a standard level L, allows for the hanging of multiple objects, such as the supports for a picture on a wall, at the same elevation and the hanging of individual objects with multiple hangers on a level plane. Multiple rule stop blocks 10 are placed on a single measuring rule 100 at the desired spacing. As stated above, aperture 62 is sized to fit a variety of fasteners sizes, but when using this method, it is useful if the same sized fasteners are used. The first fastener is attached to the wall at the desired position through aperture 62 on the first rule stop block 10. The next rule stop block 10 is placed in position the desired distance apart from the first fastener, and then another fastener is placed through aperture 62 of the second rule stop block 10; and this process can be repeated for as many rule stop blocks 10 used.

Another method of using multiple rule stop blocks 10 on a single measuring rule would be to provide the opportunity to easily determine the overall outside or inside dimensions of any small round or irregularly shaped objects, using the multiple rule stop blocks 10 as a caliper of sorts. Once the measurement of the outside or inside dimensions of the object is taken, the rule stop blocks 10 can be fixedly locked to a measuring rule and that measurement can be easily reproduced to work with the size of the object measured.

In light of the foregoing, it should be appreciated that the present invention significantly advances the art by providing a rule stop block that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A rule stop block comprising:
   a block body defined by exterior opposed end walls, opposed sidewalls, a top planar face and a bottom planar face; and
   an adjustable slider,
   wherein the adjustable slider is adjustably positioned within an interior of the block body and is adapted to engage a rule.

2. The rule stop block of claim 1, wherein the top planar face includes a window providing access to the interior of the block body.

3. The rule stop block of claim 1, wherein each of the opposed sidewalls contain a sidewall window each providing access to the interior of the block body.

4. The rule stop block of claim 3 wherein an interior top surface, an interior bottom surface, a first window end wall, and a second window end wall define each sidewall window.

5. The rule stop block of claim 4 further comprising a pair of opposed threaded holes located on the top planar face of the block body and extending through the interior top surface.

6. The rule stop block of claim 5 further comprising a pair of adjustable thumbscrews, wherein the pair of adjustable thumbscrews are receivable within the pair of opposed threaded holes and wherein the pair of adjustable thumbscrews are adapted to secure a position of the rule within the block body.

7. The rule stop block of claim 4 further comprising a pair of guide rails positioned on the interior bottom surface and a plurality of threaded holes located between the pair of guide rails.

8. The rule stop block of claim 7 wherein the adjustable slider is defined by an upper surface, a bottom surface, an elongated wall, a pair of gliders located on the bottom surface, and an aperture extending from the upper surface through the bottom surface.

9. The rule stop block of claim 8 further comprising a retaining means selectively receivable within a threaded hole of the plurality of threaded holes so as to adjustably position the adjustable slider within the interior of the block body.

10. The rule stop block of claim 9 wherein the pair of guide rails receives the pair of gliders.

11. The rule stop block of claim 6 further comprising a load distribution member positioned between the pair of thumbscrews and the rule within the interior of the block body.

12. The rule stop block of claim 1 further comprising an aperture located on the top planar face and extending through the bottom planar face, wherein the aperture is adapted to measure, level and mark locations on a workpiece.

13. A method of utilizing a rule stop block to record a measurement comprises the steps of:
   a. positioning a rule in a block body of the rule stop block;
   b. placing the rule stop block against a surface;
   c. moving the rule to establish a measurement; and
   d. securing the rule within the stop block at the established measurement.

14. The method of claim 13 wherein the step of positioning comprises the steps of:
   i. positioning an adjustable slider within an interior of the block body;
   ii. sliding the rule within a sidewall window of the block body;
   iii. tightening a pair of adjustable thumbscrews against the rule to establish a frictional fit of the thumbscrews against the rule;
   iv. positioning the adjustable slider firmly against a first edge of the rule; and
   v. securing the adjustable slider within the interior of the block body with a retaining means.

15. The method of claim 14 wherein if the rule is between 1 and 1.5 inches in width, a second edge of the rule will be positioned against a stop edge of the block body.

16. The method of claim 14 wherein if the rule is between 1.6 and 2 inches in width, a second edge of the rule will be positioned against a window edge wall of the block body.

17. The method of claim 14 wherein between steps ii. and iii., a load distribution member is positioned between the pair of adjustable thumbscrews and the rule within the interior of the block body.

18. The method of claim 14 wherein prior to the step of placing, one of the adjustable thumbscrews of the pair of adjustable thumbscrews is loosened so as to break the frictional fit of said thumbscrew.

19. The method of claim 18 wherein the step of securing includes tightening said one of the adjustable thumbscrews so as to reestablish the frictional fit.

\* \* \* \* \*